(No Model.)

T. JENNINGS.
CHAIN GEARING.

No. 582,208. Patented May 11, 1897.

Witnesses
H. van Oldenneel
E. A. Scott

Inventor
Thomas Jennings
by Richardson
Attorneys

UNITED STATES PATENT OFFICE.

THOMAS JENNINGS, OF BROOKFIELD, IRELAND.

CHAIN-GEARING.

SPECIFICATION forming part of Letters Patent No. 582,208, dated May 11, 1897.

Application filed September 17, 1896. Serial No. 606,108. (No model.)

*To all whom it may concern:*

Be it known that I, THOMAS JENNINGS, residing at Brookfield, Cork, Ireland, have invented an Improvement in Chain-Gearing, of which the following is a specification.

My invention relates to chain-gearing, and has for its object the provision of means whereby the driving load on the chain is only upon the chain when the latter is in or approximately in a straight line between the driving and driven wheels, and in this way the chain-links as they turn about their pivot-pins in passing around their sprocket-wheels are not forced into strong frictional contact with the pins, but the frictional contact is then due only to the weight of the links or the closeness of the fit between the links and said pins.

To carry my invention into effect, I arrange the chain to run upon two loose or idle wheels, so as to extend it into a more or less stretched condition. These wheels may be made with a smooth periphery without any teeth or recesses, and are arranged so that the chain engages with the driving and driven wheels from and to which the motion is transmitted upon that portion of the chain which is in or approximately in a straight line between the peripheries of the idle-wheels upon which it runs. The driving and driven wheels are provided with teeth or other equivalent means to engage the chain.

In order to insure the certain engagement of the chain with the driving and driven wheels, I prefer to arrange the idle-wheels so that a line tangential to their peripheries shall intersect the peripheries of the driving and driven wheels. I may make the axis of either one or both of the idle-wheels to be adjustable in order to tighten the chain or to vary the number of teeth of the driving or driven wheels engaged by the chain.

In order that my invention may be the better understood, I will now proceed to describe it in relation to the accompanying drawings, hereunto annexed, reference being had to the letters marked thereon.

Figure 1:
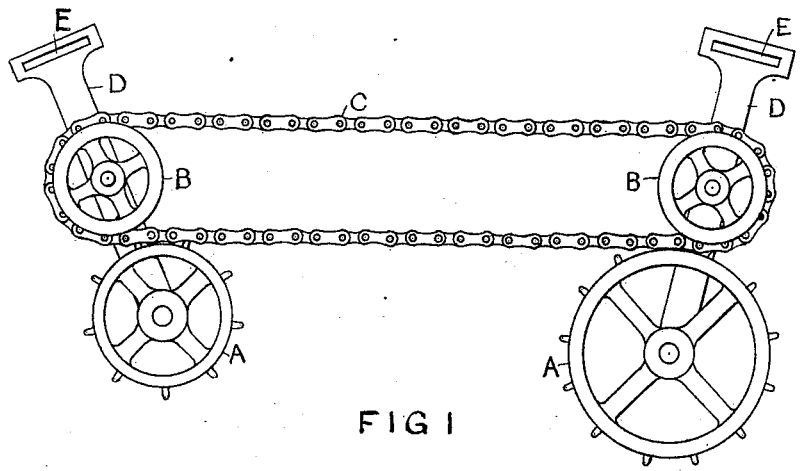
Figure 2:
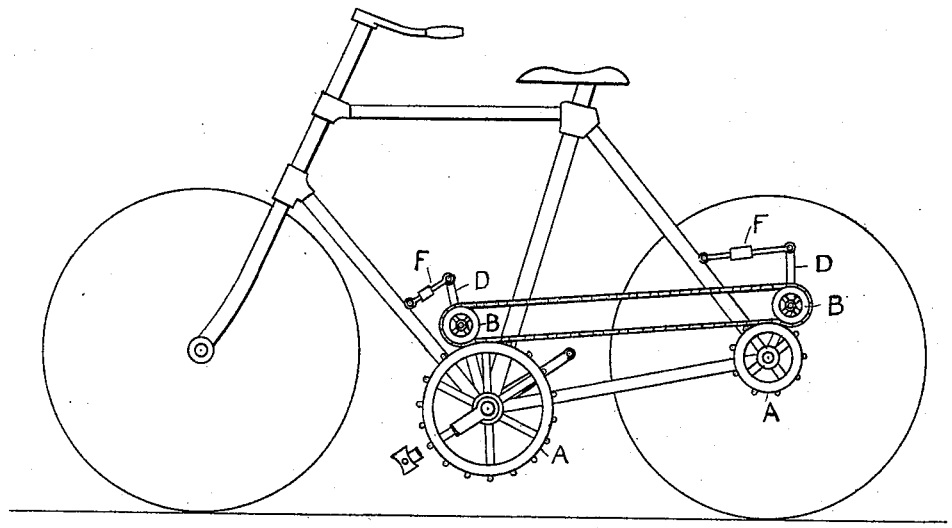

Figure 1 is a side elevation of my improved chain-gearing. Fig. 2 is a view of my gear applied to a bicycle.

Like letters refer to like parts in both figures.

A A are the driving and driven chain-wheels, and B B are the idle or carrying wheels, over which the chain C is stretched and adapted to run.

The idle-wheels B B are made adjustable by being pivotally mounted on bars or supports D, which are themselves pivotally mounted on the axle or on the part supporting the axle. The supports D are provided with means to allow of the adjustment of the idle-wheels relative to the chain-wheels to take up slack in the chain and to insure the proper engagement of the chain with the engaging means on the chain-wheels to a more or less extent, as may be desired—such, for example, as the number of teeth engaged—and when the proper position of the idle-wheels has been obtained they can be maintained in position by clamping with a screw-bolt or other equivalent device passing through the slot E in the support D.

In Fig. 2 the gear is adapted to a bicycle and is substantially the same as hereinbefore described, the only difference being that the adjustment of the idle-wheels is effected by an adjustable stay F from the frame of the bicycle to each of the supports D.

From the drawings it will be obvious that only that tooth or the two teeth to which the chain is tangential engage the chain, and thus the mechanical efficiency of the gearing is greatly increased.

The idle-wheels may, if desired, have flanges on each side thereof, between which the chain runs, and may be brought down close to the peripheries of the chain-wheels in order to prevent the chain from disengagement with the chain-wheels.

Having now described my invention, what I claim, and desire to secure by Letters Patent, is—

In combination with a cycle or other vehicle, the wheels with their axles, the sprocket-wheels, the sprocket-chain engaging therewith, the idle-wheels about which the sprocket-chain passes, the swinging supports D with means for adjusting them, said supports being carried by the shafts of the sprockets, whereby the idle-wheels may be moved concentric with the sprocket-wheel and connections between the swinging supports and the frame of the machine substantially as described.

In testimony whereof I have signed my name to this specification in the presence of two subscribing witnesses.

THOMAS JENNINGS.

Witnesses:
REGINALD WILLIAM JAMES,
JOHN C. FELL.